United States Patent
Strobel et al.

(10) Patent No.: US 10,832,381 B2
(45) Date of Patent: Nov. 10, 2020

(54) PROCESSING AT LEAST ONE X-RAY IMAGE

(71) Applicant: Siemens Healthcare GmbH, Erlangen (DE)

(72) Inventors: Norbert Strobel, Forchheim (DE); Sai Gokul Hariharan, Forchheim (DE)

(73) Assignee: Siemens Healthcare GmbH, Erlangen (DE)

( * ) Notice: Subject to any disclaimer, the term of this patent is extended or adjusted under 35 U.S.C. 154(b) by 188 days.

(21) Appl. No.: 16/047,235

(22) Filed: Jul. 27, 2018

(65) Prior Publication Data

US 2019/0035058 A1  Jan. 31, 2019

(30) Foreign Application Priority Data

Jul. 27, 2017 (EP) .................................... 17183525

(51) Int. Cl.
*G06T 5/00* (2006.01)
*G06T 5/10* (2006.01)

(52) U.S. Cl.
CPC ............... *G06T 5/002* (2013.01); *G06T 5/10* (2013.01); *G06T 2207/10116* (2013.01)

(58) Field of Classification Search
None
See application file for complete search history.

(56) References Cited

U.S. PATENT DOCUMENTS

| | | | | |
|---|---|---|---|---|
| 2005/0259889 A1* | 11/2005 | Ferrari | .................... | G06K 9/40 382/275 |
| 2013/0089247 A1* | 4/2013 | Mercuriev | .............. | G06T 5/002 382/128 |
| 2013/0216117 A1* | 8/2013 | Mercuriev | .............. | G06T 5/002 382/132 |
| 2013/0259356 A1* | 10/2013 | Stowasser | ............. | G06T 7/0012 382/132 |
| 2014/0119628 A1* | 5/2014 | Elad | ...................... | G06T 11/006 382/131 |
| 2018/0260937 A1* | 9/2018 | Gadi | ....................... | G06T 5/002 |

OTHER PUBLICATIONS

Pipeline for effective denoising of digital mammography and digital breast tomosynthesis. Borges et al. Mar. 2017.*

(Continued)

*Primary Examiner* — Delomia L Gilliard
(74) *Attorney, Agent, or Firm* — Lempis Summerfield Katz LLC (57) ABSTRACT

A method for processing at least one X-ray image is provided. A variance of noise is signal dependent. The method includes applying a variance-stabilizing transformation to image data of the at least X-ray image to generate variance-stabilized data. At least one transform parameter of the variance-stabilizing transformation is dependent on a property of the at least one X-ray image that depends on an X-ray imaging device and/or a measurement parameter used to record the at least one X-ray image. A noise reduction algorithm is applied to the variance-stabilized data to generate noise-reduced data, and an inverse transformation of the variance stabilizing transformation is applied to the noise-reduced data to generate a denoised X-ray image.

13 Claims, 5 Drawing Sheets

(56) References Cited

OTHER PUBLICATIONS

Abramov, Sergey, et al. "Methods for blind estimation of the variance of mixed noise and their performance analysis." Numerical Analysis—Theory and Application. InTech, 2011.
Boracchi, Giacomo, and Alessandro Foi. "Multiframe raw-data denoising based on block-matching and 3-D filtering for low-light imaging and stabilization." Proc. Int. Workshop on Local and Non-Local Approx. in Image Processing. vol. 1. 2008.
Borges, Lucas R., et al. "Pipeline for effective denoising of digital mammography and digital breast tomosynthesis." Medical Imaging 2017: Physics of Medical Imaging. vol. 10132. International Society for Optics and Photonics, 2017.
Cerciello, Tommaso, et al. "A comparison of denoising methods for X-ray fluoroscopic images." Biomedical Signal Processing and Control 7.6 (2012): 550-559.
Dabov, K. et. al.: "Video denoising by sparse 3d transform-domain collaborative filtering", in: Proc. 15th European Signal Processing Conference, 2007, pp. 145-149.
Dasa, Saptarshi, and Arnold Neumaiera. "Fast Regularized Low Rank Approximation of Weighted Data Sets." 2011.
Derpanis, Konstantinos G. "Overview of the RANSAC Algorithm." Image Rochester NY 4.1 (2010): 2-3.
Deuerling-Zheng, Yu, et al. "Motion compensation in digital subtraction angiography using graphics hardware." Computerized Medical Imaging and Graphics 30.5 (2006): 279-289.
European Search Report for European Patent Application No. 17183525.9-1906 dated Sep. 22, 2017.
European Search Report for European Patent Application No. 18162005.5-1210 dated Jun. 20, 2018.
Foi, Alessandro, et al. "Practical Poissonian-Gaussian noise modeling and fitting for single-image raw-data." IEEE Transactions on Image Processing 17.10 (2008): 1737-1754.
Foi, Alessandro. "Clipped noisy images: Heteroskedastic modeling and practical denoising." Signal Processing 89.12 (2009): 2609-2629.
Guo, Qiang, et al. "An efficient SVD-based method for image denoising." IEEE transactions on Circuits and Systems for Video Technology 26.5 (2016): 868-880.
Han, Heechul, et al. "Texture preserving noise reduction for ultra high ISO images." Consumer Electronics—Berlin (ICCE—Berlin), 2014 IEEE Fourth International Conference on. IEEE, 2014.
Luisier, Florian, and Thomas Blu. "Image Denoising by Pointwise Thresholding of the Undecimated Wavelet Coefficients: A Global Sure Optimum." ICASSP (1). 2007.
Maggioni, Matteo, et al. "Video denoising, deblocking, and enhancement through separable 4-D nonlocal spatiotemporal transforms." IEEE Transactions on image processing 21.9 (2012): 3952-3966.
Makitalo, Markku, and Alessandro Foi. "Optimal inversion of the generalized Anscombe transformation for Poisson-Gaussian noise." IEEE transactions on image processing 22.1 (2013): 91-103.
Niu, Kai, et al. "Ultra low radiation dose digital subtraction angiography (DSA) imaging using low rank constraint." Medical Imaging 2015: Physics of Medical Imaging. vol. 9412. International Society for Optics and Photonics, 2015.
Ponomarenko, Nikolay N., et al. "An automatic approach to lossy compression of AVIRIS images." Geoscience and Remote Sensing Symposium, 2007. IGARSS 2007. IEEE International. IEEE, 2007.
Seyid, Kerem, et al. "Block matching based real-time optical flow hardware implementation." Circuits and Systems (ISCAS), 2016 IEEE International Symposium on. Ieee, 2016.
Söderman, Michael, et al. "Image noise reduction algorithm for digital subtraction angiography: clinical results." Radiology 269.2 (2013): 553-560.

\* cited by examiner

PROCESSING AT LEAST ONE X-RAY IMAGE

This application claims the benefit of EP17183525.9, filed on Jul. 27, 2017, which is hereby incorporated by reference in its entirety.

BACKGROUND

The present embodiments are related to processing at least one X-ray image.

In X-ray imaging (e.g., in medical imaging), it is desirable to use low X-ray intensities to lower the X-ray dose radiated onto the subject. Reducing the intensity of the X-ray radiation and/or shortening the acquisition time will lower the dosage, but at the same time, the noise level in the images will increase. The noise in X-ray imaging is therefore to be reduced for using low X-ray dosages during image acquisition (e.g., when X-ray sequences are acquired).

A comparison of different denoising methods for X-ray fluoroscopic images is discussed in the paper CERCIELLO, T. et. al.: "A comparison of denoising methods for X-ray fluoroscopic images," in: Biomedical Signal Processing and Control, 2012, Vol. 7, pp. 550-559. This paper discusses two distinct families of denoising algorithms, one designed for signal-dependent noise and one designed for independent additive noise. It was found that filters designed for signal-dependent noise provided better image restoration than those assuming additive white noise.

A denoising approach for images corrupted by additive Gaussian white noise is discussed in the paper LUISIER, F. et. al.: "Image Denoising by Pointwise Thresholding of the undecimated wavelet coefficients: A Global Sure Optimum," Conference Paper in Acoustics, Speech, and Signal Processing, 2007. An undecimated wavelet transform is used. To reduce noise, thresholding is applied to the undecimated wavelet coefficients. Stein's unbiased risk estimate (SURE), an unbiased estimator of the mean-squared error, is minimized to determine the parameters of the denoise function.

For the denoising of camera images, the paper FOI, A.: "Clipped noisy images: Heteroskedastic modeling and practical denoising," in: Signal Processing. 2009, Vol. 89, No. 12, pp. 2609-2639, proposes a multistep approach to denoising. A variance-stabilizing transformation is applied to the original data to provide a transformed image with approximately Gaussian noise. The transformed image is filtered. This allows the use of filters optimized for removing Gaussian noise. Afterwards, the filtered image is debiased, and an inverse transform is applied. The additional debiasing may be avoided if an exact unbiased inverse transformation is used. This is discussed in the paper MAKITALO M. et. al.: "Optimal Inversion of the Generalized Anscombe transformation for Poisson-Gaussian Noise," in: IEEE TRANSACTIONS ON IMAGE PROCESSING, VOL. 22, NO. 1, JANUARY 2013.

Denoising may be improved when temporal coherence between several images of an image sequence is taken into consideration and used during noise removal. This approach is used in the paper DABOV, K. et. al.: "Video denoising by sparse 3d transform-domain collaborative filtering," in: Proc. 15th European Signal Processing Conference, 2007, pp. 145-149. A noisy video is processed in a blockwise manner, and for each processed block, a 3D data array is formed by stacking together blocks found to be similar to the currently processed one. This grouping is realized as a spatio-temporal predictive-search block-matching. The 3D group is filtered by a 3D transform-domain shrinkage using hard-thresholding and Wiener filtering. For this filtering, the term "collaborative filtering" is introduced. Similar denoising approaches are discussed in the papers by MAGGIONI, M. et. al.: "Video Denoising, Deblocking and Enhancement Through Separable 4-D Nonlocal Spatiotemporal Transforms," in: IEEE Trans. Image Process., 2012, Vol. 21, No. 9, pp. 3952-3966 and in BORACCHI, G. et. al.: "Multiframe raw-data denoising based on block-matching and 3-D filtering for low-light imaging and stabilization," in: Proc. Int. Workshop on Local and Non-Local Approx. in Image Process, LNLA 2008, Lausanne, Switzerland.

The previously discussed approach of grouping similar patches of an image may also be used within a single image. This is discussed in the paper GUO, Q. et. al.: "An Efficient SVD-Based Method for Image Denoising," in: IEEE TRANSACTIONS ON CIRCUITS AND SYSTEMS FOR VIDEO TECHNOLOGY, Vol. 26, No. 5, MAY 2016. Similar image patches are classified by a block-matching technique to form similar patch groups, which results in the similar patch groups to be low rank. Each group of similar patches is factorized by singular value decomposition and estimated by taking only a few largest singular values and corresponding singular vectors. The denoised image is generated by aggregating all processed patches.

Noise removal may accidentally remove structures within an image. To counteract this effect, the paper HAN, H. et. al.: "Texture Preserving Noise Reduction for Ultra High ISO Images," in: Consumer Electronics—Berlin (ICCE-Berlin), 2014 IEEE Fourth International Conference, 2014, DOI: 10.1109/ICCE-Berlin.2014.7034260, proposes to blend the input noisy image to the noise reduced image and add Gaussian noise.

The following papers are not concerned with noise reduction but provide information about several techniques that may be used in the context of the present embodiments. The paper SEYID, K. et. al.: "Block Matching Based Real-Time Optical Flow Hardware Implementation," in: Circuit and Systems (ISCAS), 2016 IEEE International Symposium (pp. 22.06-2209) concerns an approach to implementing an optical flow estimation, which is a special form of motion estimation, in hardware.

The paper PONOMARENKO N. N. et. al.: "An Automatic Approach to Lossy Compression of AVIRIS Images," in: 2007 IEEE International Geoscience and Remote Sensing Symposium. IEEE, 2007, pp. 472-475, discusses the compression of hyper spectral images. The quantization steps used for the compression for a certain group of channels are determined depending on the variance of the noise in this group of channels. Noise for each channel is estimated in the frequency domain.

The random sample consensus (RANSAC) algorithm is a well-known approach for estimating parameters. Information about this algorithm is provided e.g. by DERPANIS, K. G.: "Overview of the RANSAC Algorithm," in: Image Rochester N.Y., vol. 4, no. 1, pp. 2-3, 2010.

SUMMARY AND DESCRIPTION

The scope of the present invention is defined solely by the appended claims and is not affected to any degree by the statements within this summary.

The present embodiments may obviate one or more of the drawbacks or limitations in the related art. For example, an improved method for denoising an X-ray image as well as X-ray image sequences is provided.

A method for processing at least one X-ray image is provided. A variance of noise is signal dependent. The method includes applying a variance-stabilizing transformation to the image data of the X-ray image to generate variance-stabilized data. At least one transform parameter of the variance-stabilizing transformation is dependent on a property of the X-ray image that depends on the X-ray imaging device and/or a measurement parameter used to record the X-ray image. A noise reduction algorithm is applied to the variance-stabilized data to generate noise-reduced data, and an inverse transformation of the variance stabilizing transformation is applied to the noise-reduced data to generate a denoised X-ray image.

One or more of the present embodiments use a variance-stabilizing transform that is parameterized by at least one transform parameter that is dependent on a property of the X-ray image that depends on the X-ray imaging device and/or a measurement parameter used to record the X-ray image. This is highly relevant, since different X-ray imaging devices, different image acquisition modes, and different image acquisition parameters may generate different mixtures of noises and/or offsets. Conventionally, non-parameterized variance-stabilization transforms such as the square root transformation or the classical Anscombe transformation are used to stabilize the variance prior to noise reduction when processing X-ray images. These transforms are sufficient when the noise may be approximated as purely signal depended noise (e.g., as a Poisson distributed noise). When using low dosage X-ray imaging, the quality of the denoising may, however, be strongly improved by using a parameterized transformation because at very low dose levels, the detector signal is corrupted by signal-dependent (e.g., quantum) noise as well as by electronic noise (e.g., white electronic sensor noise). This improved transformation may allow for X-ray imaging with very low dosages (e.g., below 1 nGy (nanogray) detector entrance dose). By improving the denoising, motion estimation may also be improved in a sequence of X-ray images. Low dose imaging may, for example, be used for X-ray fluoroscopy.

When multiple, successive X-ray images are denoised, all steps or some of the steps of the denoising may be performed independently for each of the frames. For example, the transformation parameters of the variance-stabilizing transformation may be determined for each frame or for several groups of frames. This is advantageous when the acquisition parameters may change during a sequence (e.g., when an automatic exposure control and/or gain adjustment is used during X-ray image acquisition).

The variance-stabilizing transformation may be optimized for a mixed noise situation, where the noise contains at least one component with a scaled or non-scaled Poisson distribution and one component with a Gaussian noise distribution. When using an ideal X-ray imaging device, the noise may be purely signal dependent and have a Poisson distribution due to the quantum nature of the received photons that may be scaled by a gain factor. For example, at low X-ray dosages, the electronic noise of the system, which is approximately Gaussian, and/or offsets of the system also become relevant and may be taken into account in the variance-stabilizing transformation. Since the amount of signal dependent noise, the amount of Gaussian noise, and the offset may change depending on the measurement mode used, the dosage used and/or a gain used during the image acquisition the transform parameters may also change from image to image.

A variance-stabilizing transformation is a transformation of the image data that creates new values such that the variance of the new values is ideally not related to their mean value. Since variance stabilization is typically not ideal in real world applications, a complete independence will typically not be reached. The variance of the variance-stabilized data is, however, less dependent on the mean value than the original data, such that a noise reduction algorithm that is optimized for the removal of a Gaussian noise may typically be used on the variance-stabilized data. The generalized Anscombe transformation may be used as the variance-stabilizing transformation. This transformation will be discussed later. The measurement parameters and/or the transformation parameters may be a gain used during the image acquisition, a system offset of the X-ray imaging device used for the image acquisition, a variance of the Gaussian noise present in image that is, for example, caused by an electronic noise of the X-ray imaging device, or further parameters derived from those parameters.

The transform parameters may be determined by a calibration procedure. For example, a known phantom may be measured several times, the data may be averaged to remove noise, and the noise characteristics may be determined for the used measurement parameters. Since this is a rather elaborate procedure and the noise in the X-ray image may also depend on properties of the depicted object, the transform parameter or transform parameters may, however, be calculated directly from the X-ray image. This will be discussed later.

Since the variance is stabilized before the noise reduction algorithm is applied, any denoising algorithm designed for removing Gaussian noise may be applied. In one embodiment, a wavelet based denoising algorithm may be used (e.g., the algorithm discussed in the previously cited paper by F. LUISIER).

The method may be extended by including the act or acts to acquire the X-ray image or a sequence of X-ray images.

In a more general embodiment of the method discussed above, the denoising may be applied to image data recorded by any device (e.g., any medical imaging device or an optical as well as an electron microscope). In this more general method, the acquired image may be used instead of the X-ray image, and the used image acquisition device may be used instead of the X-ray imaging device.

The at least one transform parameter (e.g., noise stabilization transform parameters) may be determined from the image data. In this case, no additional information about the X-ray imaging device or the measurement parameters is necessary.

Multiple sections of the image may be selected, and a data point describing a mean value and an estimate of the variance of the image data in the section may be determined for each of the sections. A given function that calculates an expected variance within a section from the mean value of the section may be parameterized by at least one function parameter, where the function parameter is determined by fitting the function to the data points or a subset of the data points. At least one function parameter is used as the transform parameter or used to determine the transform parameter.

The sections may be coherent sections (e.g., rectangular sections; small, flat patches without any texture). The suggested approach determines multiple data points that describe a local mean value and an estimate for the variance. By fitting a given function that describes a noise model, the function parameters that describe parameters of the noise may be determined. By the selection of specific sections or a specific subset of the data points, an influence of sections in which the estimated variance is strongly influenced by local features may be avoided.

One noise model that may be used as the given function may be derived as follows.

The influence of noise may theoretically be removed by averaging over a multitude of measurements. The mean measured grey value of each pixel maybe calculated as $$\bar{y} = a \cdot \bar{x} + p \quad (1)$$

$\bar{y}$ is the average measured value, $\bar{x}$ is the average number of X-ray quanta received in this pixel in each measuring interval, a is a system gain, and p is a system offset. In a normal measurement, where no averaging is applied, the measured value y depends on the number of X-ray quanta in the actual measurement interval and also on an added noise. This may be expressed as:

$$y = a \cdot x + p + n \quad (2)$$

The variance of the measured values $\sigma_y^2$ may then be calculated as:

$$\sigma_y^2 = a^2 \cdot \sigma_x^2 + \sigma_n^2 \quad (3)$$

$\sigma_x^2$ is a Poisson-distributed signal depended noise of the X-ray quanta, and $\sigma_n^2$ is the variance of an additional Gaussian noise (e.g., an electrical noise of the X-ray imaging device).

If multiple pixels are averaged to reduce the noise, which is also referred to as binning, the average grey values y would not change, but the variance $\sigma_u^2$ of the individual values would be lowered by a vector of k<1 when the same pixel weights are used for all pixels:

$$\sigma_u^2 = (a^2 \cdot \sigma_x^2 + \sigma_n^2) \cdot k \quad (4)$$

Since the variance of Poisson-distributed noise is equal to the mean value, the equation may be rewritten as:

$$\sigma_u^2 = (a^2 \cdot \bar{x} + \sigma_n^2) \cdot k \quad (5)$$

With equation (1) and the fact that the mean values of u and x are the same, this equation may be rewritten as:

$$\sigma_u^2 = a \cdot k \cdot (\bar{u} - p) + \sigma_n^2 \cdot k \quad (6)$$

Since only the influence of the gain a and the variance $\sigma_n^2$ for denoising and not the actual gain and variance of the Gaussian noise during the measurement are relevant, new variables a' and σ' may be introduced, and the formula may be rewritten as follows:

$$\sigma_u^2 = a' \cdot \bar{u} + \sigma'_n{}^2 - a' \cdot p \quad (7)$$

This equation may be used as the noise model and therefore the given function. The equation defines the variance in terms of the mean value $\bar{u}$, an effective gain a', and an effective variance of the Gaussian noise $\sigma'_n{}^2$.

After fitting equation (7) to the previously determined data points or to a subset of these data points, the slope a' and the intersection of this linear function with the y-axis, $\sigma'_n{}^2 - a' \cdot p$, may be determined. These parameters may be directly used as transform parameters of the variance-stabilizing transformation. The generalized Anscombe transformation may then be written as:

$$t = \frac{2}{a} \sqrt{a' \cdot u + \frac{3}{8}(a')^2 + \sigma'_n{}^2 - a' \cdot p} \; . \quad (8)$$

The transformed values t therefore only depend on the original value u, the gain a', and therefore, the slope of equation (7), the term $\sigma'_n{}^2 - a' \cdot p$, and the y-axis intercept of equation (7). With the same parameters, the inverse transformation may also be calculated if, for example, a simple algebraic inverse transform $$\hat{u} = a \cdot \left(\frac{D^2}{4} - \frac{3}{8}\right) - \left(\frac{\sigma'_n{}^2 - a' \cdot p}{a'}\right) \quad (9)$$

of the generalized Anscombe transformation is used. The variable D denotes the noise-reduced data for the respective pixel, and $\hat{u}$ denotes the grey value of the pixel in the denoised X-ray image.

In an alternate embodiment, a combination of a wavelet decomposition of the noisy image and a maximum-likelihood estimation of the noise parameters may be used, as discussed, in the previously discussed paper by A. FOI.

The given function may be a linear function of the mean value of the section. This holds true for the noise model discussed above. The use of a linear function allows for robust fitting to the data points or the subset of the data points.

At least one of the transform parameters or an additional parameter that is used in the inverse transformation may be determined in dependence of at least one of the function parameters and a mean value of the image data in at least one of the sections and/or in at least one additional section of the image data. The section may be a section that is expected to measure no X-ray quanta (e.g., a section that is shadowed by collimation or a section outside of the X-ray beam). The mean value in this section will be approximately equivalent to the system offset p in equation (7). This allows for an explicit calculation of the parameter $\sigma'_n{}^2$ and therefore of an estimate of the variance of the Gaussian noise in the image as an additional parameter. An explicit calculation of the variance of the Gaussian noise is to be provided if the approximate or exact bias free inverse of the Anscombe transformation (e.g., discussed in the previously cited paper by MAKITALO) is to be used as the inverse transform. Typically, it is, however, sufficient to use the inverse transform given by equation (9).

The random sample consensus (RANSAC) algorithm may be used to select the subset of the data points used for fitting the given function. Details of this algorithm are discussed in the previously cited text by K. DERPANIS. A weighted version of this algorithm, where reliable estimates are given more importance, may be used to disregard outliers that do not fit to a noise model (e.g., when the noise estimate is wrong due to certain structures in the relevant section).

The RANSAC algorithm may include a selection of a preliminary group of data points, a preliminary fitting of the given function to the preliminary group of data points, and a calculation of an especially weighted distance of all data points to the preliminary fitted given function to determine how many of the data points are within a tolerance interval of the preliminary fitted given function. The selection of the preliminary data points depends on the image data in the section of the X-ray image used to determine the respective data point. Instead of using a completely random selection from the data points to determine the preliminary data points, different data points may be selected with different probabilities. This may lead to a faster convergence of the algorithm and/or a better fit. As discussed below, this weighting of the individual data points may be used to avoid the use of data points that have either been computed from unreliable estimates or are assigned to a section that contains structures that may lead to a wrong estimate of the variance. The selection of the preliminary data points may be performed such that the difference in the mean values of these data points is larger than a threshold value. This may improve fitting for a linear given function.

Each section of the image data may be transformed to the frequency domain, where a low frequency content of the section determines whether a data point is generated for the section or influences the selection of the generated data point for this section as part of the preliminary group of data points. Alternatively or additionally, the estimate for the variance for the section is dependent on the high frequency content of the section. The section may, for example, contain an array of eight by eight or sixteen by sixteen pixels. A discrete cosine transform may be applied to the section. If the frequency of the frequency components increases with the column and row number, a threshold may be defined for the sum of the column and the row number to distinguish between the high frequency and the low frequency content. Constant offsets may be eliminated from the low frequency part by ignoring the DC component.

The sum of the low frequency components is an indication of the amount of structure in the section. In one embodiment, data points of sections containing little to no structure may be used for the determination of the parameters of the given function. Therefore, the sections for which data points may be generated and/or the probability that a certain data point is chosen for the preliminary group may be determined by sorting all sections according to a low frequency content and selecting the probabilities or the sections for which data points may be calculated dependent on this order. Discarding sections with a high low frequency content to estimate the variance may be advantageous, since slopes or structures within each section may influence the determined variance.

As already discussed, a generalized Anscombe transformation may be used as a variance-stabilizing transformation. In one embodiment, a simple algebraic inverse of this transform may be used as the inverse transformation. Alternatively, the exact unbiased inverse transform or an approximation thereof may be used as discussed above.

The denoised images or sets of noise-reduced data may be generated for all X-ray images of a sequence. The method includes the additional acts of dividing each of the denoised images or sets of noise-reduced data and the X-ray images into overlapping or non-overlapping patches. Each patch depicts an image region of the respective image. Each patch of each X-ray image has a corresponding patch taken from the denoised image or set of noise-reduced data generated from that X-ray image depicting the same image region. The patches of the denoised images or of the sets of noise-reduced data are divided into several groups. Each group includes similar patches taken from at least two denoised images or sets of noise-reduced data. Corresponding groups of the patches of the X-ray images are selected. Each group contains the patches of the X-ray images that correspond to the patches of the denoised images or the sets of noise-reduced data in the corresponding group. A collaborative denoising algorithm is applied to each group of patches of the X-ray images to generate a denoised patch for each patch of the X-ray images. The image data of at least one of the denoised patches of each group depends on the image data of at least two of the patches of the X-ray images of that group. A final image is generated for at least one of the X-ray images. The image data of each pixel of the final image depends on the pixel value of a corresponding pixel in the image data of at least one of the denoised patches that depicts an image region that contains the pixel.

These additional acts realize a collaborative denoising of the X-ray images of the associated X-ray image sequence and therefore allow the temporal coherence between the images to be exploited for denoising purposes. Approaches for a collaborative denoising of multiple patches are known from the papers of M. MAGGIONI, G. BORACCHI and Q. GUO, which were previously cited. While these papers teach to directly determine a similarity between patches of the X-ray images and group similar images, the method of one or more of the present embodiments uses patches of denoised images or of sets of noise-reduced data to determine similarities, and then groups the patches of the X-ray images that depict the same regions of the same images. This reduces the influence of noise on the grouping. Therefore, the grouping of similar patches may be improved, therefore improving the overall quality of the denoising and therefore of the final image. This is important at, for example, very low X-ray dose levels leading to patches suffering from very low signal-to-nose ratios.

The collaborative denoising algorithm may be optimized to remove Gaussian noise. It may therefore be advantageous to apply a variance-stabilizing transformation to the individual X-ray images or corresponding patches prior to the collaborative denoising and to apply an inverse transform to the denoised patches or the final image. Depending on the automatic X-ray exposure control, the same transformation parameters may be used for the variance-stabilizing transformation for all X-ray images. In one embodiment, individual transform parameters determined for each separate X-ray image may, however, be used. The denoised image may be considered to be a prediction or an oracle image for final image. This prediction or preliminary denoising does not take the temporal coherence of the X-ray images of the sequence into account. Since the prediction or preliminary denoising does, however, reduce the noise level and tends to conserve features in the images, the prediction or preliminary denoising is useful for sorting the patches into groups of similar patches.

To reduce the necessary processing for the method, sets of noise reduced data may be used instead of the denoised images. The same initial processing is applied to the X-ray images, but the final inverse transformation from the noise-reduced data to the denoised X-ray image is skipped. In that case, the final image may be considered to be the only denoised image, since the final image is the only image for which the inverse transformation of the variance-stabilizing transformation is applied.

For the collaborative denoising, a fixed number of future and/or past images may be included. For real time fluoroscopy, only patches from past X-ray images may be considered. The patch matching and/or the collaborative denoising may be implemented on a graphics processing unit (GPU), since such processors may be especially efficient for implementing matrix operations. It is possible that all patches contain the same number of pixels and/or all groups contain the same number of patches. It is, for example, possible that each group contains 5 patches and each patch contains 16×16 pixels.

In one embodiment, each group contains at most one patch from each X-ray image. In this case, the collaborative denoising is exclusively based on the temporal coherence between the X-ray images. In one embodiment, one patch from each X-ray image is included in each group.

To improve the matching of similar patches of the denoised images or of the sets of noise-reduced data, a motion information that describes the movement of individual pixels or groups of pixels between denoised images or sets of noise-reduced data generated from consecutive X-ray images of the sequence may be determined. The grouping of the patches of the denoised images or of the sets of noise-reduced data depends on the motion information. The motion information may define constraints for the relative position of the grouped patches in the images. The motion information may, for example, be generated via an optical flow algorithm. Optical flow algorithms are well known, for example, from the previously cited paper by K. SEYID and will not be discussed in detail.

The collaborative denoising may be achieved by applying a low-rank approximation to a matrix representation of the image data of the group. The mathematical background of a low-rank approximation is, for example, provided in the previously cited paper by Q. GUO et al. To apply the low-rank approximation to the full patches of a group, the individual patches may be vectorized as individual columns or rows that contain all the data of the patch and then stacked to form the matrix that is approximated by the low rank approximation. In an alternative embodiment, the low-rank approximation may be performed for individual rows or columns of the patches in each group, and those in the matrix that are approximated may be stacked. A non-weighted low rank approximation may minimize the Frobenius norm of the difference between an approximate matrix and the original matrix with the additional condition that the rank of the approximate matrix is smaller than or equal to a given rank. The Frobenius norm sums the squares of all matrix entries of the difference matrix. In one embodiment, a weighted low-rank approximation, in which each of the terms in the minimized sum and therefore each entry of the difference matrix is assigned a weighting factor and the weighted sum is minimized, may be used. Ways to use a weighted low-rank approximation to improve denoising will be discussed later.

An unweighted low-rank approximation may be performed by first applying a singular value decomposition to the matrix A. It is known that a matrix A may be decomposed into a product of matrixes U×S×V, where S is diagonal with descending diagonal elements. In this case, the low rank approximation may be calculated as $$A_{LRA} = \sum_{i=1}^{r} u_i s_i v_i^t \qquad (10)$$

where $u_i$ and $v_i$ are the column vectors of the matrix U and V, where $s_i$ are the individual diagonal elements of the matrix S, where a small i corresponds to a large value of $s_i$ since the elements are sorted in descending order, and where the sum terminates with the maximum desired rank r.

To optimize the denoising performance, the rank r may be chosen depending on the variance of the noise in the X-ray image to be denoised and especially on the diagonal elements $s_i$ of the matrix S. If the original matrix A has a rank of N, the sum over the N−r smallest diagonal elements $s_i$ may be equal or smaller than the variance, and the sum over the N−r+1 smallest $s_i$ may be larger than the variance.

The low-rank approximation may be applied separately for each row or column of the patches of the group. In this case, the rank of low-rank approximation may be limited to 1. The low-rank approximation may be expanded to take a spatial coherence into account. Instead of processing rows or columns of the patches individually, the neighboring rows or columns may be included. In the following example, rows of the patches will be processed. The same approach may also be transferred to columns.

First, we select the row from each patch for which the optimization may be performed. Then, a matrix $A^g$ is built, stacking the previous row, the current row, and the next row, and repeating this for all the patches. Submatrices $A_i^g$ that each contain only one row of each of the patches are also defined. Therefore, one of the matrixes $A_i^g$ contain all previous rows, the next one contains all current rows, and the next one contains all next rows. As previously discussed, the matrix A may be approximated by a low-rank approximation matrix that may be defined as the product U×S×V. This approximation may be performed by minimizing the following expression:

$$\left\|\sum_i (A_i^g - U_i S_i V_i^t)\right\|_W + \frac{a_u^x}{2}\|B_u^x U\| + \qquad (11)$$
$$\frac{a_v^x}{2}\|B_v^x V\| + \frac{a_u^y}{2}\|B_u^y U\| + \frac{a_v^x}{2}\|B_v^x V\|,$$

where $a^x$ and $B^x$ represent the regularizers and the differential operators in the horizontal direction, respectively, and $a^y$ and $B^y$ represent the regularizers and the differential operators in the vertical direction, respectively. As an additional condition, the rank of the matrix USV is limited to the rank r.

Once the low rank approximation is performed, the approximation matrix $A_{LRA}$ represents the denoised patches of the group or, if individual rows or columns are separately denoised, the respective denoised rows or columns of each patch of the group. To enhance denoising, an average patch may be calculated for each of the patches of the group by calculating a respective weighted average of all patches in the group. Each of the denoised patches corresponds to one of the patches taken from the denoised images. To calculate the weighting factor of a first patch in the weighted sum used to calculate the average patch for a second patch, a function depending on the patch taken from the denoised images corresponding to the first patch and a patch taken from the denoised images corresponding to the second patch may be evaluated. The function may measure a similarity between the patches taken from the denoised images (e.g., the normalized cross-correlation or the structural similarity index). The individual weights may be normalized by dividing the individual weights by the sum of the weights to provide that the sum of the weights is one. In a similar way, columnwise denoising may be applied to the stack including low rank approximated patches to improve denoising performance.

When a final image is generated for a selected X-ray image of a sequence, a weighted low-rank approximation may be used as the collaborative denoising algorithm, where the weights may depend on which of the X-ray images is the selected X-ray image. In other words, separate weights may be used for the creation of final images for different X-ray images. The rows of the matrix may correspond to a respective patch and therefore to the X-ray image from which that patch is taken and the denoised image generated from that X-ray image. The columns of the matrix may correspond to different pixel positions within the respective patch. To calculate the weight for a given row and column, a measure for the difference between two pixel environments may be calculated. The first environment may surround a pixel in the denoised image corresponding to the row, where the pixel position is defined by the position of the patch corresponding to the row in the X-ray image from which that denoised image is generated and the pixel position within that patch defined by the column. A second environment surrounds a pixel in the denoised image generated from the selected X-ray image, where the pixel position is defined by the position of the patch of the group that is taken from the selected X-ray image in that image and the pixel position within that patch defined by the column. The role of the rows and columns may be reversed.

The patches in a group are collected in the same group, since the patches are similar. As discussed previously, motion constraints may be used when determining similar patches. The selection of similar patches and the optional motion constraints may result in a motion compensation, such that an object that moves through different pixel positions in the different X-ray images will have the same or at least very similar pixel positions within the patches of the same group. While the entries in one column of the matrix therefore represent the same pixel position within the different patches, the entries may represent different positions in the X-ray images and the respective denoised images. The change of the pixel position in the X-ray and denoised images for the same pixel position in the patches represents an estimate for the motion of this pixel. Since the first environment and the second environment are centered around the same pixel position in the patches of the group, the first environment and the second environment will normally represent the same environment even if this environment has moved between the different X-ray acquisitions. The weight is therefore dependent on the similarity of the same environment after motion correction between the different denoised images.

Occasionally, patches or parts of patches may be mismatched. Therefore, a high weight may be assigned in the low-rank approximation, and therefore, a high relevance may be assigned to pixels of patches, with an environment that matches well with the respective environment in the denoised image that is generated from the X-ray image for which the final image is generated.

The weight may decrease exponentially with an increasing difference between the respective environments.

$$W = \exp\left(-\frac{\delta}{\sqrt{2}\, h\sigma}\right) \quad (12)$$

W is the weighting factor, and δ is a measure of the difference of the environments (e.g., the 2-norm of a difference picture of both environments). The parameter σ represents the square root of the variance of the noise of the relevant denoised images, and h is a scaling factor.

When a grey value of a background is known, the weight of a pixel may be increased if the pixel belongs to the background. This may be achieved by choosing the weight as follows:

$$W = \exp\left(-\frac{\delta}{\sqrt{2}\, h\sigma \cdot f(A)}\right) \quad (13)$$

$$f(A) = 1 + a \cdot \exp\left(-\frac{(b-A)}{\sigma^2}\right) \quad (14)$$

b represents the gray value of the background, A represents the means value of the pixel, and a is a free parameter.

In an alternate method for denoising a sequence of X-ray images, a denoised image may be calculated by any denoising approach, not just by approaches that use noise stabilization. The denoised image may be created by performing denoising on an individual X-ray image independent of the other X-ray images.

The denoising of an image (e.g., when using a collaborative denoising as described above) may lead to a loss of structure in the image (e.g., to blurring). A common approach to reintroduce lost structure is to mix the denoised image with the original X-ray image and add a bit of noise. This approach may lead to a strong increase in noise (e.g., when used for low dosage X-ray images). Therefore, an alternative approach may be used.

In the method according to one or more of the present embodiments, a structure map may be generated from the X-ray image and/or the denoised image and/or the final image. The structure map describes at least one area of the X-ray image that contains a structure that is not sufficiently reproduced in the denoised and/or final image. For each pixel of an output image, the respective pixel of the denoised or the final image is used if the pixel is outside of the described area, and a blend of the final image and the denoised image or a blend of the denoised image or the final image and a further image generated in dependence of the X-ray image is used if the pixel is inside the described area or one of the described areas. This approach is based on the idea of using an image with strong denoising that might have lost structure information and blending in the structure from a less blurred and denoised image in relevant parts to conserve the structure.

As discussed previously, the denoised image is typically generated from a single X-ray image, while the generation of the final image uses the temporal coherence between X-ray images of a sequence. Typically, relevant structures (e.g., small moving electrodes) depicted in the X-ray images are well conserved in a denoised image if the denoising is performed within one single image. For example, when a relative movement of small structures with respect to background structures (e.g., organs of a patient) is expected, these structures may be blurred when using a temporal coherence between the images of a sequence to further decrease noise (e.g., when calculating a final image as discussed above). The denoised image may therefore be considered to be a structure conserving first image that may be used to add structure information back into a strongly denoised second image (e.g., the final image).

The second image may be denoised using temporal denoising while the first image uses exclusively special denoising. An exclusively special denoising may be more successful in conserving structure in the image.

The structure map may be generated in dependence of a difference image of the first image and the second image. The structure map may therefore represent structures not reproduced in the second image. Since this difference image also contains additional noise, further processing of the difference image may be performed.

The difference image may be denoised by, for example, setting all pixels that have an absolute value smaller than a threshold value to zero. The threshold value may depend on a standard deviation of the noise of the difference image. This may, for example, be determined by transforming several patches of the difference image to the frequency domain, selecting patches with a low-frequency content, and evaluating the noise from the high-frequency content of these patches.

A positive and a negative difference image may be created from the difference image by setting all negative values to zero in the positive difference image, and vice versa. This may be performed after the previously discussed thresholding or may be combined with the thresholding.

To remove individual pixels that typically do not represent real structures, first, a morphological erosion and then, a morphological dilation may be applied to the difference image or, for example, to the separated positive and negative difference images. After applying these operations, the positive and negative difference images may be merged.

Alternatively, the structure map may be generated by an algorithm that recognizes the structures in the first image and may distinguish the structures from noise. Such an algorithm may, for example, be trained by machine learning.

An alternative method for adding back structure information in the denoised or final image may be to use an algorithm that takes a structure conserving first image and a second image as input images and directly generates an output image in which structure information from the first image is added back into the second image. Such an algorithm may, for example, be trained by machine learning.

The denoising may be performed for a digital subtraction angiography, where denoised images or sets of noise-reduced data are generated for each X-ray image of the angiography sequence. A respective mask image is subtracted from each denoised image of each X-ray image. The mask images are generated by selecting the same X-ray image as basic mask image for all source X-ray images. A motion compensation is performed on a denoised image or on noise reduced data of the basic mask image to generate motion compensated data, and the pixel values for mask data that is used to determine the mask image via the inverse transform or for the mask image are set to the value of the corresponding pixel of the motion compensated data if a similarity condition for that pixel is fulfilled, and to the value of the corresponding pixel of the denoised image or the noise reduced data of the basic mask image otherwise. The similarity condition depends on the pixel values of the pixels surrounding the respective pixel in the denoised image or the noise reduced data of the respective source image and in the motion compensated data.

Instead of denoising the difference images, the mask image and all source images of the angiography sequence are independently denoised. As previously discussed, the denoising may be performed in a variance-stabilized domain. The subtraction of the images may be performed for logarithmic images. The logarithm of each image may be taken first, and the results may then be subtracted. As an alternative, the images may first be divided, and the logarithm may then be calculated from the resulting pixel values (e.g., quotients).

As all the frames of the X-ray sequence, including frames free from contrast agent, are denoised, the basic mask image may be chosen from one of the frames without contrast agent. For example, the first frame of the sequence or one of the first frames of the sequence may be chosen. This avoids the necessity of requiring a high-dosage less noisy mask image.

The patient or parts of the patient may move between the acquisition of the individual X-ray images. Therefore, the motion may be compensated by applying a motion compensation to the mask. The mask compensation may, for example, be performed by using an optical flow algorithm to determine the motion between the X-ray images. The motion may be determined in the denoised images or in the noise reduced data sets.

The problem of a motion compensation based on the recorded X-ray images in a subtraction angiography is that due to the flow of the contrast agent, the image content strongly changes. Therefore, using a completely motion compensated mask image may result in artifacts. The motion compensated data is therefore compared to the denoised source image. In areas flooded by the contrast agent, these images will not coincide, and therefore, the information of the denoised image or the noise reduced data of the basic mask image is used to determine the final mask in the areas flooded by the contrast agent. The motion compensation is therefore not performed in these areas. If the area surrounding the pixel in the motion compensated mask is however similar to the same area in the denoised source image, there is no or little contrast agent in that area, and the motion compensated data may be used.

The motion compensation and/or the comparison of the surroundings of the pixels may be performed in the variance-stabilized domain and therefore before applying the inverse transform to generate the motion compensated image.

The motion compensated data may be used when a measure for the difference between the surrounding pixels is smaller than a threshold. The measure may be the standard deviation of the difference of the motion compensated data and the denoised source image. A given number of pixels (e.g., 5 or 8 pixels) may be considered in each direction. The threshold may depend on the standard deviation of noise in the denoised images (e.g., the denoised source image). In one embodiment, the threshold is the standard deviation multiplied by the square root of two.

Multiple X-ray images may be acquired and denoised, and/or final images may be generated for the X-ray images. At least one measurement parameter used to record the X-ray image is changed between the acquisitions of at least two of the X-ray images. The change of the parameter may, for example, be automatic. The parameter may depend on the image data of at least one previously recorded X-ray image and/or on sensor data recorded during the prior acquisition. The parameter may, for example, be changed by an automatic exposure control and/or an automatic gain adjustment of an X-ray imaging device.

Besides the method, one or more of the present embodiments provide an X-ray imaging device that includes a processing unit (e.g., a processor) for processing acquired image data. The processing unit is constructed and/or programmed (e.g., configured) to denoise an X-ray image according to the method.

One or more of the present embodiments provide a computer program that may be directly loaded into a memory unit of a processing unit (e.g., a proceeding unit of an X-ray imaging device). The computer program includes instructions for performing the acts of the method when the program is executed on the processing unit.

Additionally, one or more of the present embodiments provide a computer-readable storage medium (e.g., a non-transitory computer-readable storage medium) containing electronically readable instructions including the computer program.

DETAILED DESCRIPTION

Figure 1:
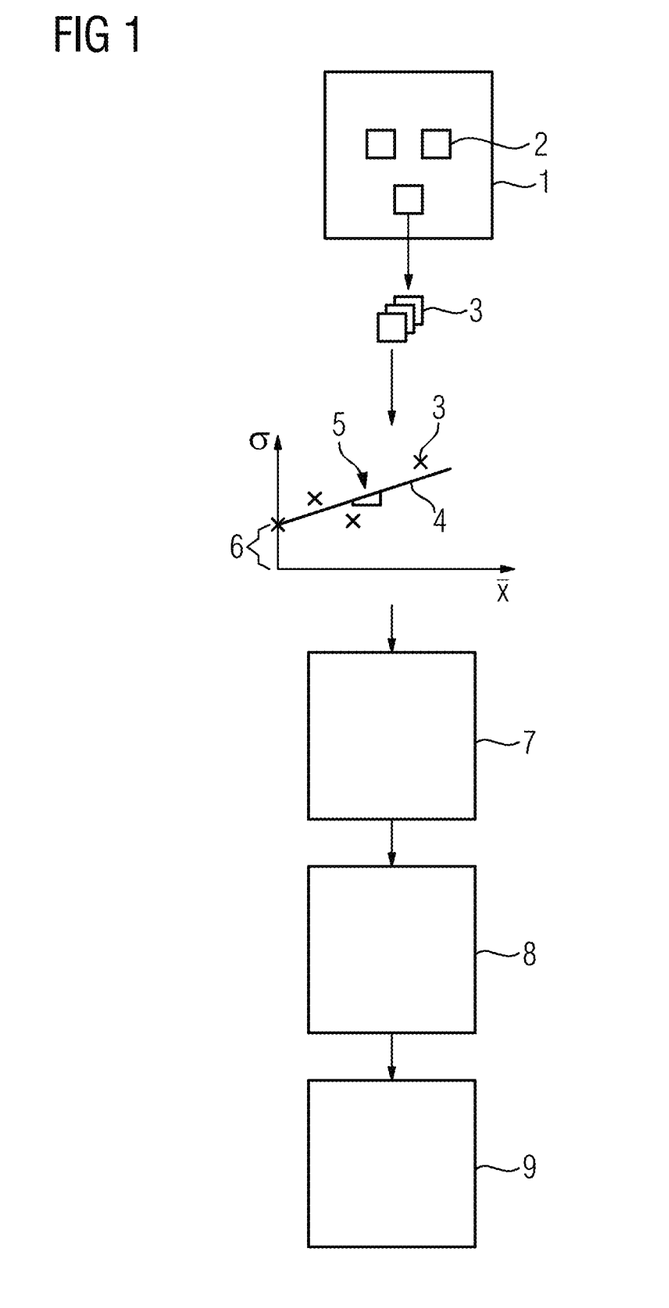
FIG. 1 illustrates the denoising of an X-ray image by an embodiment of a method.

FIG. 1 schematically shows the acts used to denoise an X-ray image 1, where a variance of a noise in the X-ray image 1 is signal dependent. The noise is especially dependent on a property of the X-ray imaging device used to acquire the image (e.g., electrical noise at the detector for the selected image acquisition protocol (exam set)) and on measurement parameters used to record the X-ray image. The discussed approach to denoising may be used when imaging parameters are dynamically selected during the X-ray acquisition.

As discussed below, the post processing parameters are directly determined from the image data, which provides that the denoising may even be applied when parameters (e.g., the gain of the detector, the frame rate, or an X-ray dose) change during the image acquisition. The image may, for example, be acquired during a coronary angiography, where the frame rate and/or the dose may be reduced when the heart is approximately at rest and increased during the systole. Another reason for switching the detector gain during an image sequence is to avoid over exposure (e.g., during a rotational angiography run) or if a different tube voltage is set or when a copper filter is driven in.

To generate a denoised X-ray image 9 (e.g., at very low dose levels) several acts are provided. First, a variance-stabilizing transform (e.g., a generalized Anscombe transformation) is applied to the image data of the X-ray image 1 to generate variance-stabilized data 7. A noise reduction algorithm (e.g., an undecimated wavelet filtering based on SURE based thresholding) may then be applied to the variance-stabilized data 7 to generate noise-reduced data 8 that may then be used to generate the denoised X-ray image 9 by applying in inverse transformation to the variance-stabilizing transformation applied previously.

If the variance is successfully stabilized by the variance-stabilizing transformation, the resulting noise in the variance-stabilized data 7 is approximately Gaussian with known variance, and the variance is therefore approximately independent of the mean value of the measured signal. Therefore, any noise reduction algorithm that may be used to reduce additive Gaussian noise may be used to generate the noise-reduced data 8.

Variance-stabilization is nontrivial for X-ray images (e.g., X-ray images acquired at very low X-ray doses), since the resulting noise will typically be mixed noise and therefore contain additive components with a Gaussian distribution and with a Poisson distribution. Non-parameterized variance stabilization transforms such as the square root transform or the classical Anscombe transformation tend to produce insufficient variance stabilization. To achieve a sufficient variance-stabilization, the generalized Anscombe transformation is used. To apply this transform, it is, however, necessary to know certain imaging parameters such as the gain, a, of the detector and any offset. Then, $\sigma_n^2 - a\mathrm{xp}$ may be calculated, where $\sigma_n^2$ is the variance of the Gaussian noise in the X-ray image 1, and p is a system offset generated by the X-ray imaging device.

These transform parameters may be directly calculated from the X-ray image 1. For this purpose, several sections 2 of the X-ray image 1 are selected, and for each of these sections, a data point 3 that describes a mean value and an estimate for the variance of the image data in the section 2 is described. In FIG. 1, only three sections 2 and only three data points 3 are shown. Typically, a multitude of sections and data points are used. The sections may overlap, or separate sections may be used.

To find smooth (e.g., flat) image regions for variance estimation, the image data in the sections 2 is transformed to the frequency domain (e.g., via the discrete cosine transform). The DC component is discarded and the further frequency components are split into high frequency components, where the sum of the column and row number is larger than a threshold value, and the remaining low frequency components. The sum of the low frequency components is used to determine a likelihood that the respective section contains a structure that may lead to false results for the variance estimation. If the sum of the low frequency components is low, the section is essentially flat and the high frequency content of the section will be dominated by noise.

The sections 2 are therefore sorted in the order of ascending values of the sum of the low frequency components. Depending on the order, different probabilities are assigned to the data points that are calculated from the sections 2. The use of these probabilities for fitting a function defining the noise is described later. Alternatively, the sections 2 showing high sums of the low frequency components may be discarded.

The high frequency components for each section 2 are also added, and the sum is used, potentially after scaling, as an estimate for the variance in the respective section 2. Other methods to find smooth patches may be used as well (e.g., based on local image descriptors).

To determine the transform parameters and therefore also the properties of the X-ray image concerning noise, a given function that describes the noise model is fitted to the data points. Thanks to the physics of X-ray imaging, a linear noise model that has the parameters slope 5 and y-axis intersection 6 is used. The parameters correspond to the parameters necessary for parameterizing the generalized Anscombe transformation. This may be seen by comparing equation (7) that describes the noise model and equation (8) that describes the generalized Anscombe transformation.

The function 4 is fitted to the data points 3 via a RANSAC algorithm. In the first step of this algorithm, typically a minimum number of points required to determine the model parameters is randomly chosen. For a linear function, at least two data points 3 are to be selected. Instead of using a completely random choice of data points, the previously determined probabilities for the different data points 3 are used. Therefore, it is more likely to choose a data point 3 belonging to a section 2 that has a lower low frequency content and therefore probably no real structure.

For the chosen data points, the function 4 is calculated, and how many points fit within a predefined tolerance is checked from the function 4. If a sufficient number of points fit within the tolerance, the algorithm is terminated, and the points within the tolerance are picked as inlayers. Otherwise, new data points are chosen, and the steps are repeated. Typically, the algorithm is stopped after a certain number of maximum repeats, and the largest set of inlayers is chosen. After the set of inlayers is determined, the function 4 is fitted to the inlayers, and the slope 5 and y-axis intersection 6 may be calculated. With these parameters, the generalized Anscombe transformation and a corresponding inverse given in equation (9) may be calculated. Therefore, the denoised image 9 may be generated.

In certain cases (e.g., when an unbiased inverse Anscombe transformation should be used), it may be necessary to explicitly calculate the variance $\sigma_n^2$ or the system offset p. This may be achieved by selecting one of the sections 2 or an additional section that is expected to receive no X-ray intensity and calculating an average value for this section. This average value will be a good approximation of the system offset p. Since the gain, a, is already known from the slope 5, $\sigma_n^2$ may be calculated from equation (7).

Figure 2:
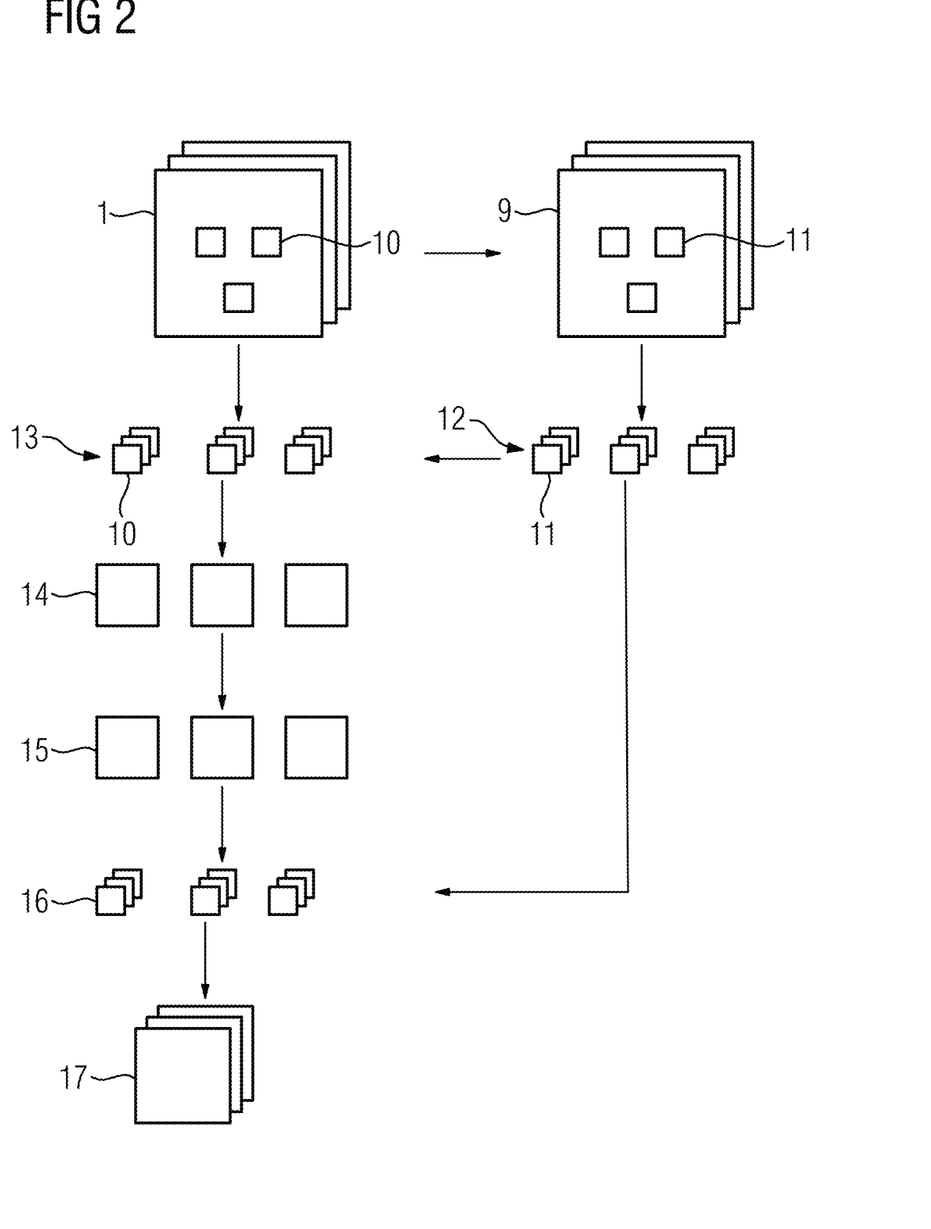
FIG. 2 illustrates the denoising of a sequence of X-ray images by an embodiment of a method.

In many cases, sequences of X-ray images 1 are acquired as part of a sequence in which there is a strong temporal coherence between temporary adjacent X-ray images 1. This is, for example, true for fluoroscopy, where images are acquired with a relatively high frame rate and with relatively low dosages. FIG. 2 shows an example how this temporal coherence of the X-ray images 1 may be used to further improve the denoising of the X-ray images 1.

In a first act for each of the X-ray images 1, a denoised image 9 is generated. The generation of the denoised image 9 may be performed as discussed with reference to FIG. 1.

Afterwards, each of the X-ray images 1 and each of the denoised images 9 is divided into patches 10, 11. Only three of the patches 10, 11 are shown in FIG. 2. Typically, the full area of the X-ray image 1 and the denoised image 9 is covered by patches 10, 11, and the patches may overlap. Each patch 10 of the X-ray image 1 has a corresponding patch taken from the denoised image 9 generated from that X-ray image 1 that is depicting the same image region.

In a next act, the patches 11 of the denoised images are sorted into groups 12 of similar patches 11. Each of the groups 12 includes exactly one patch 11 from each of the denoised images 9. That provides that the denoising will only use the temporal coherence of the X-ray images 1. The grouping of the patches 11 may be performed such that each patch 11 in the groups 12 essentially shows the same region of the object depicted in the X-ray images 1. If the object or parts of the object move, the patches 11 may be selected such that the object is always at the same position in the patches 11 of a group 12. This may already be achieved by matching similar patches. In one embodiment, motion information is also used as an additional constraint while grouping the patches 11 into the groups 12. To determine the local movement, for example, an optical flow algorithm may be applied to the denoised images 9, and the resulting motion information may be used as a constraint while grouping the patches 11. The optical flow algorithm is well known in the prior art and will not be discussed in detail.

In the next act, corresponding groups 13 of the patches 10 of the X-ray images are chosen, where each group 13 includes the patches of the X-ray images 1 that correspond to the patches of the denoised images 9 in the corresponding group 12. If, for example, a first group 12 of the patches 11 includes a patch 11 at a first position in a first denoised image 9, the corresponding group 13 includes a patch 10 taken from an identical position from the X-ray image 1 used to generate that first denoised image 9. The grouping of the patches 11 into the groups 12 therefore defines the grouping of the patches 10 into the groups 13. Compared to a direct grouping of the patches 10 by, for example, grouping similar patches 10, this approach has the advantage of reducing the influence of noise on the grouping of the images.

For each of the groups 13, a matrix 14 is generated by first vectorizing the patches 10 as individual rows and then stacking the vectorized patches 10 along the columns of the matrix 14 or vice versa. In some cases, a matrix may be created for each row or column of the patches 10 of the group 13 to reduce the size of the matrix 14. If, for example, patches 10 with sixteen rows and sixteen columns are used and the group 13 includes five patches 10, a matrix 14 that incorporates the full patches may have 256 columns and 5 rows, or vice versa. Instead, the patches 10 may be split into individual rows and columns that may be combined into separate matrices 14. This may result in sixteen separate matrices 14 for the group 13, each having sixteen rows and five columns, or vice versa. Since only the temporal coherence is used in the denoising, both approaches lead to the same results.

In the next act, a low-rank approximation matrix 15 is generated for each of the matrices 14. The easiest way to perform a low-rank approximation is to calculate the singular value decomposition of the matrix 14 and to set a number of lowest diagonal elements of the diagonal matrix of this decomposition to zero. As already discussed, the number of the non-zero elements in the diagonal matrix may be equivalent to the rank of the resulting approximate matrix, and the rank may be determined in dependence on the variance of the X-ray image 1 to be denoised.

In an alternative embodiment, the low-rank approximation may be solved by minimizing a norm of the difference of the matrices 14 and 15. In this case, an individual weight may be given to the individual entries of the matrix 14 to determine how relevant individual entries may be during the low-rank approximation. This is useful when the low-rank approximation is performed separately for each final image 17 that may be generated. As already discussed, the weights may depend on the similarity of the patch of the current matrix element to the equivalent patch in the X-ray image 1 or the corresponding denoised image 9 for which the current final image 17 may be calculated.

In the next act, averaged patches 16 are calculated for each of the initial patches 10. In an intermediate act that is not shown, the matrices 15 are split into denoised patches. For each of the averaged patches 16, a weighted average of the denoised patches is calculated. The weights may depend on the similarity between the respective denoised patch and the patch of the denoised images 9 corresponding to the average patch. The similarity may be calculated by a normalized cross-correlation or by the structure similarity index.

The average patches 16 are aggregated to reconstruct the final image 17. If the original patches 10 overlap, the pixels in the final image 17 may be calculated as a sum of the overlapping pixels in the different average patches 16.

The low-rank approximation may be calculated in the variance-stabilized domain. The transition to the variance-stabilized domain via a variance-stabilizing transformation (e.g., the Anscombe transform) and the inverse transform may be performed, as discussed, with respect to FIG. 1. It is possible to perform only the low-rank approximation in the variance-stabilized domain. It is, however, also possible to perform multiple or all of the other acts shown in FIG. 2 in the variance-stabilized domain.

When applying noise reduction to an image (e.g., when a collaborative denoising is used that uses the temporal coherence between X-ray images), some structure in the images may be lost. Small moving objects, for example, may not be clearly depicted in the final images 17. One approach to add back some of the lost structure is to blend the final image with the original X-ray image and a bit of a Gaussian noise. This approach works well at high X-ray intensities but tends to add too much noise when using low X-ray intensities (e.g., in the case of fluoroscopy). An alternative approach to recovering structure lost during denoising is discussed with reference to FIG. 3.

Figure 3:
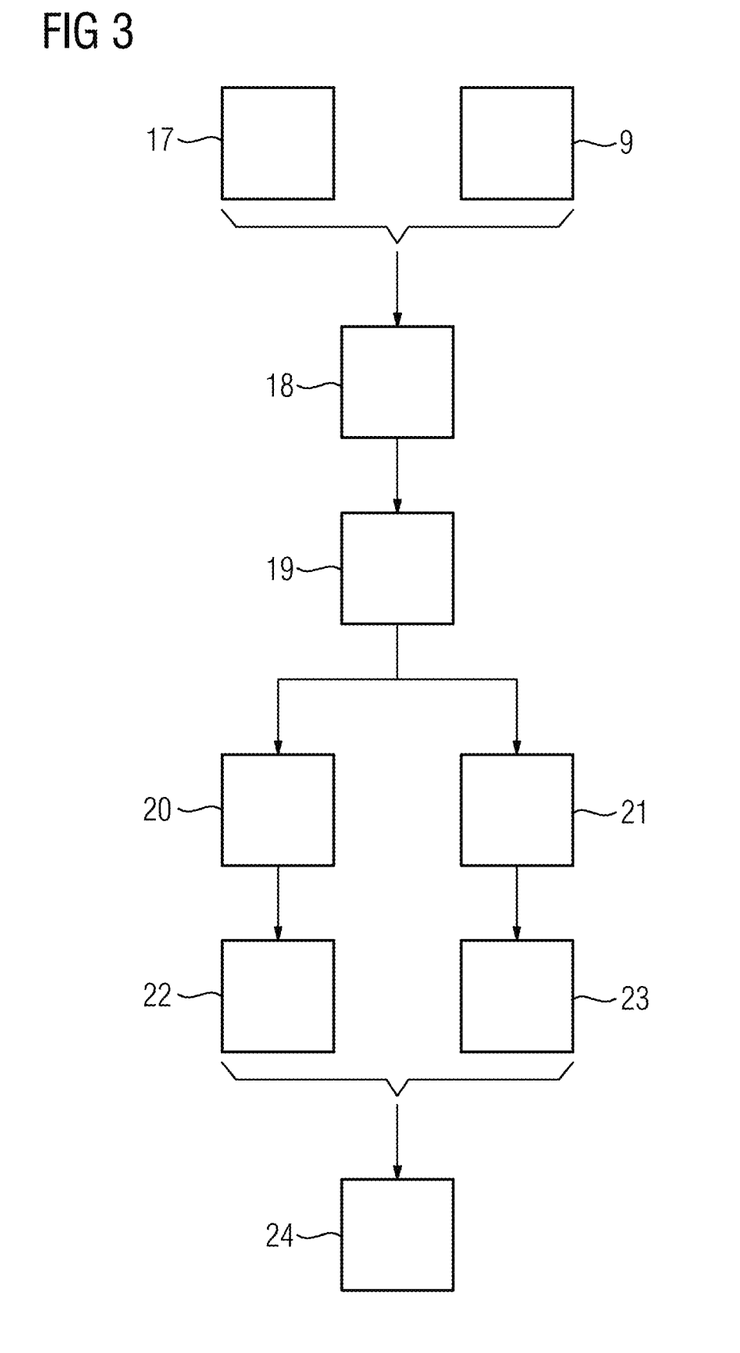
FIG. 3 illustrates additional acts that may be used to improve the conservation of structures depicted in the X-ray images in the method shown in FIG. 2.

Since the denoised images 9 are separately generated for each X-ray image, the structures in these images are typically well conserved. The structures may therefore be used as a reference to detect areas of the X-ray images that contain a structure that is not sufficiently reproduced in the final images 17. To generate a structure map that shows the relevant areas, a difference image 18 is calculated by subtracting the final image 17 from the denoised image 9. To remove noise in the difference image, all pixel values that are smaller than a given threshold value are set to zero in a threshold image 19. The threshold is chosen in dependence of the variance of the noise of the difference image 18. The variance may, for example, be calculated by selecting several patches of the difference image 18, transforming the patches into the frequency domain, selecting one or more patches with a low frequency content, and estimating the variance of the noise from the high frequency content.

For further processing, the threshold image 19 is split into a positive image 20 in a negative image 21. In the positive image 20, all negative pixel values are set to zero, and vice versa. This step is taken since it is expected that all real structures in the difference image may be either all positive or all negative. The thresholding and the splitting of the image into a positive and a negative image 20, 21, respectively, may alternatively be combined into a single step by using purely positive and purely negative thresholding.

To eliminate single pixels that are typically caused by noise and not by real structures, morphological filtering is applied to the positive and negative images 20, 21 to produce the processed images 22, 23. Morphological filtering is similar to a convolution operation, but instead of a summing or integrating over the convolution Kernel, the maximum or minimum value is chosen. To remove isolated pixels, first, morphological erosion is applied, and then, morphological dilation is applied. The erosion removes the border of each group of non-zero pixels by choosing the minimum from the relevant area (e.g., a two by two pixel area), and the dilation adds the borders back in for the structures not completely eliminated by choosing the maximum from the relevant area.

The processed images 22, 23 are combined to the structure map 24. Since the structure map 24 only needs to provide binary information, if there is a structure that is not sufficiently reproduced in the final image 17 in a certain area or not, it is sufficient to use a single bit for each pixel that may, for example, be set to one if that pixel contains a none zero value in either of the processed images 22, 23, and may be set to zero if that pixel is zero in both processed images 22, 23. Other representations of this information may be provided.

In a further act not shown in FIG. 3, an output image is generated by blending the filtered image 9 back into the final image 17 in the areas where the structure map indicates that the structure was previously lost. For a pixel where no loss of structure is indicated in the structure map (e.g., where the relevant bit is zero), the pixel value for the output image is taken from the final image. If the structure map 24 does, however, indicate a loss of structure (e.g., if the relevant bit is one), the pixel value is calculated as a weighted sum of the respective pixel in the final image 17 and in the filtered image 9.

Since the denoised image 9 is used as a source for the structure information, and the structures are only added back in selected parts of the image, very little noise is added back into the output image, while still adding back structure information that might be lost otherwise.

The discussed denoising of X-ray images may also improve the image quality and reduce the X-ray dosage in digital subtraction angiography. Since a contrast may be improved by denoising, the amount of contrast agent used may also be reduced, which may reduce the burden on the kidney of a patient.

Figure 4:
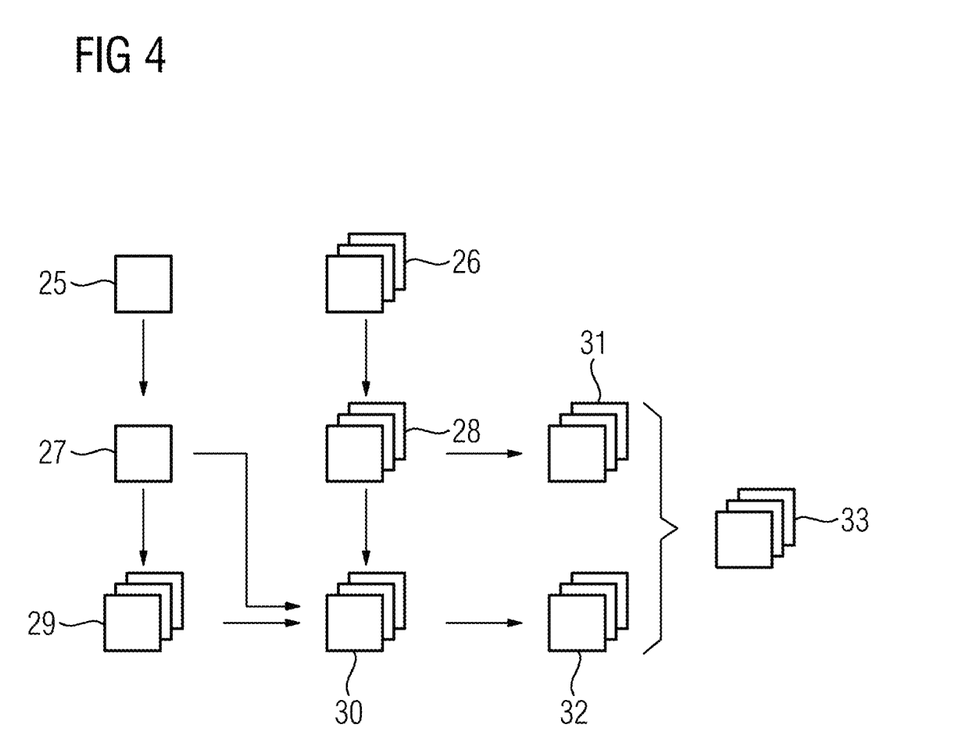
FIG. 4 shows an embodiment of the method used for image denoising in a digital subtraction angiography.

As shown in FIG. 4, multiple X-ray images 25, 26 are recorded in an X-ray sequence. The X-ray image 25 is essentially free of contrast agent in the relevant area and is chosen as a basic mask image for all source X-ray images 26. To reduce noise in the X-ray images 25, 26, final images 27, 28 are generated with a method similar to the method discussed with respect to FIGS. 1 and 2. Therefore, only a brief overview of the process and a discussion of the differences will be given.

As discussed with respect to FIG. 1, individual denoising is performed for each of the X-ray images 25, 26. As discussed with respect to FIG. 2, similar patches of the denoised images are grouped, and the corresponding patches of the X-ray images are also grouped. Then, a collaborative denoising is applied to the group of patches from the X-ray images 25, 26.

The major difference in the processing is that a weighted low-rank approximation problem is solved, where different weights may be used for each of the X-ray images 25, 26. As previously discussed, a matrix for the patches in each group is generated. This matrix is approximated by minimizing a weighted sum, where the individual summands are the product of a weighting factor and the square of the difference of the original matrix and the approximated matrix for each matrix entry.

The weights chosen for denoising a selected X-ray image 25, 26 may be computed by comparing pixel neighborhoods in the corresponding denoised images with respect to noise as discussed with reference to equation (12). Essentially, each matrix entry corresponds to a certain pixel position in a certain patch, and therefore, to a certain pixel position in one of the X-ray images 25, 26 and in the denoised image generated from that X-ray image 25, 26. One of the patches, the selected patch, will be from the selected X-ray image 25, 26 that may be denoised by that application of the low-rank approximation. The environments that are compared to calculate the difference $\delta$ are the environment of the pixel in the denoised image selected by the current column and row of the matrix and of the pixel at the pixel position selected by the row or column in the selected patch.

Since the patches are individually denoised by separate low-rank approximations, the averaging step discussed with regard to FIG. 2 is skipped. The application of the inverse transformation of the variance-stabilizing transformation may be delayed, and the following acts may also be performed in the variance-stabilized domain. As a result, noise reduced data 27 for the mask image and noise reduced data 28 for the source X-ray images 26 is generated.

A motion compensation is performed on the noise reduced data 27 to generate motion compensated data 29 for a motion compensated mask for each of the source X-ray images 26. The motion compensation may be performed by performing a motion detection (e.g., by using an optical flow algorithm; on the noise-reduced data 27, 28), and then applying motion correction to the noise reduced data 27.

The motion correction of the noise-reduced data 27 of the basic mask image will only yield correct results in areas where there is essentially no contrast agent flow. Therefore, in an extra act, mask data 30 is generated from the motion compensated data 29, where for each pixel of the mask data 30, either the corresponding pixel value of the motion compensated data 29 or of the noise reduced data 27 is used. To decide which of these two pixel values to choose, the environment of the respective pixel in the motion compensation data is compared to the environment in the noise-reduced data 28 for the same point in time. If a measure for the difference between these environments is smaller than a threshold value, the pixel value is taken from the motion compensated data 29. Otherwise, the pixel value is taken from the noise-reduced data. In other words, the motion compensated data is used in areas where the motion compensated data matches the actually acquired image well. The noise reduced version of the basic mask is used in other areas.

In the next act, the inverse transformation of the variance-stabilizing transformation is applied to the noise-reduced data 28 and the mask data 30 to generate denoised source images 31 and denoised motion compensated mask images 32. Afterwards, pairs of the denoised sources images 31 and the denoised motion compensated mask images 32 are subtracted from each other (e.g., after taking a logarithm) or divided before taking the logarithm to calculate the images 33 of the digital subtraction angiography.

Figure 5:
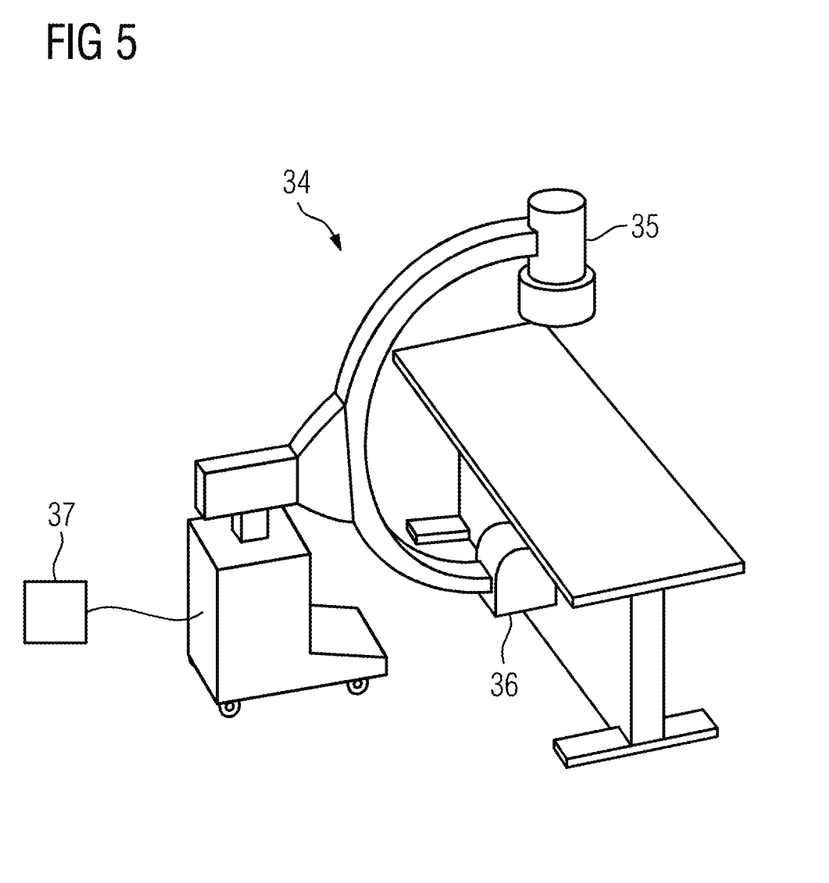
FIG. 5 shows an embodiment of an X-ray imaging device.

FIG. 5 shows one embodiment of an X-ray imaging device 34 that includes a processing unit 37 for processing acquired image data, acquired by using an X-ray source 35 and an X-ray detector 36. The processing unit is constructed and/or programmed (e.g., configured) to denoise X-ray images as previously discussed.

The discussed method may be implemented by a computer program that may be directly loaded into a memory unit of the processing unit 37. The computer program includes instructions for performing the acts of the previously discussed methods. The computer program may be stored on a computer-readable storage medium that is not shown.

Although the present invention has been described in detail with reference to exemplary embodiments, the present invention is not limited by the disclosed examples from which the skilled person is able to derive other variations without departing from the scope of the invention.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for processing at least one X-ray image, wherein a variance of noise is signal dependent, the method comprising:
generating variance-stabilized data, the generating of the variance-stabilized data comprising applying a variance-stabilizing transformation to image data of the at least one X-ray image, wherein at least one transform parameter of the variance-stabilizing transformation is dependent on a property of the at least one X-ray image that depends on an X-ray imaging device, a measurement parameter used to record the X-ray image, or the property of the X-ray image that depends on the X-ray imaging device and the measurement parameter used to record the X-ray image;
generating noise-reduced data, the generating of the noise-reduced data comprising applying a noise reduction algorithm to the variance-stabilized data;
generating a denoised X-ray image, the generating of the denoised X-ray image comprising applying an inverse transformation of the variance stabilizing transformation to the noise-reduced data, wherein denoised images or sets of noise-reduced data is generated for all X-ray images of a sequence of X-ray images;
dividing each of the denoised images or sets of noise-reduced data and the X-ray images into overlapping or non-overlapping patches, each of the overlapping or non-overlapping patches depicting an image region of the respective image, wherein each of the overlapping or non-overlapping patches of each X-ray image has a corresponding patch taken from the denoised image or set of noise-reduced data generated from that X-ray image depicting the same image region;
dividing the patches of the denoised images or of the sets of noise-reduced data into a plurality of groups, wherein each group of the plurality of groups includes similar patches taken from at least two denoised images or sets of noise-reduced data;
selecting corresponding groups of the patches of the X-ray images, wherein each of the corresponding groups includes the patches of the X-ray images that correspond to the patches of the denoised images or the sets of noise-reduced data in the corresponding group;
generating a denoised patch for each patch of the X-ray images, the generating of the denoised patch for each patch of the X-ray images comprising applying a collaborative denoising algorithm to each of the corresponding groups of patches of the X-ray images, wherein the image data of at least one of the denoised patches of each of the corresponding groups depends on the image data of at least two of the patches of the X-ray images of the respective group;
generating a final image for at least one of the X-ray images, wherein the image data of each pixel of the final image depends on a pixel value of a corresponding pixel in the image data of at least one of the denoised patches that depicts an image region that contains the pixel; and
generating a structure map from the X-ray image, the denoised image, the final image, or any combination thereof, the structure map describing at least one area of the X-ray image that contains a structure that is not reproduced in the denoised image, the final image, or the denoised image and the final image, wherein for each pixel of an output image the respective pixel of the denoised image or the final image is used when the pixel is outside of the described area, and a blend of the final image and the denoised image, or a blend of the denoised image or the final image and a further image generated in dependence of the X-ray image is used when the pixel is inside the described area or one of the described areas.

2. The method of claim 1, wherein the at least one transform parameter is determined from the image data.

3. The method of claim 2, further comprising:
selecting multiple sections of the at least one X-ray image; and
determining a data point describing a mean value and an estimate of a variance of the image data in a section for each of the multiple sections, wherein a given function that calculates an expected variance within the respective section from the mean value of the section is parameterized by at least one function parameter;
determining the at least one function parameter, the determining of the at least one function parameter comprising fitting the function to the data points or a subset of the data points,
wherein at least one function parameter is used as the transform parameter or used to determine the transform parameter.

4. The method of claim 3, wherein the given function is a linear function of the mean value of the section.

5. The method of claim 3, wherein at least one of the transform parameters or an additional parameter that is used in the inverse transformation is determined in dependence of at least one of the function parameters and a mean value of the image data in at least one of the multiple sections, in at least one additional section of the image data, or in at least one of the multiple sections, and in at least one additional section of the image data.

6. The method of claim 3, wherein a random sample consensus algorithm is used to select the subset of the data points used for fitting the given function.

7. The method of claim 6, wherein the random sample consensus algorithm comprises a selection of a preliminary group of data points, a preliminary fitting of the given function to the preliminary group of data points, and a calculation of a weighted distance of all data points to the preliminarily fitted given function to determine how many of the data points are within a tolerance interval of the preliminary fitted given function, and
wherein the selection of the preliminary data points depends on the image data in the section of the X-ray image used to determine the respective data point.

8. The method of claim 3, wherein each of the sections of the image data is transformed to the frequency domain, wherein a low frequency content of the section determines whether a data point is generated for the section or influences the selection of the generated data point for the section as part of the preliminary group of data points, wherein the estimate for the variance for the section is dependent on the high frequency content of the section, or any combination thereof.

9. The method of claim 1, wherein a generalized Anscombe transformation is used as the variance-stabilizing transformation.

10. The method of claim 1, wherein multiple X-ray images are acquired and denoised, final images are generated for the multiple X-ray images, or a combination thereof, and
wherein at least one measurement parameter used to record the X-ray image is changed between the acquisition of at least two of the X-ray images.

11. An X-ray imaging device, comprising:
a processor for processing acquired image data, wherein a variance of noise is signal dependent, the processor being configured to:
generate variance-stabilized data, the generation of the variance-stabilized data comprising application of a variance-stabilizing transformation to image data of the at least one X-ray image, wherein at least one transform parameter of the variance-stabilizing transformation is dependent on a property of the at least one X-ray image that depends on an X-ray imaging device, a measurement parameter used to record the X-ray image, or the property of the X-ray image that depends on the X-ray imaging device and the measurement parameter used to record the X-ray image;
generate noise-reduced data, the generation of the noise-reduced data comprising application of a noise reduction algorithm to the variance-stabilized data;
generate a denoised X-ray image, the generation of the denoised X-ray image comprising application of an inverse transformation of the variance stabilizing transformation to the noise-reduced data, wherein denoising is performed for a digital subtraction angiography, wherein denoised images or sets of noise-reduced data are generated for each X-ray image of the angiography sequence, wherein a respective mask image is subtracted from the denoised image of each X-ray image, and wherein the mask images are generated by selecting the same X-ray image as a basic mask image for all source X-ray images;
generate motion compensated data, the generating of the motion compensated data comprising performing a motion compensation on a denoised image or on noise reduced data of the basic mask image;
set the pixel values for mask data that is used to determine the mask image via the inverse transform or for the mask image to the value of the corresponding pixel of the motion compensated data when a similarity condition for that pixel is fulfilled, and to the value of the corresponding pixel of the denoised image or the noise reduced data of the basic mask image otherwise,
wherein the similarity condition depends on the pixel values of the pixels surrounding the respective pixel in the denoised image or the noise reduced data of the respective x-ray source image and in the motion compensated data.

12. In a non-transitory computer-readable storage medium that stores instructions executable by a processor to process at least one X-ray image, wherein a variance of noise is signal dependent, the instructions comprising:
generating variance-stabilized data, the generating of the variance-stabilized data comprising applying a variance-stabilizing transformation to image data of the at least one X-ray image, wherein at least one transform parameter of the variance-stabilizing transformation is dependent on a property of the at least one X-ray image that depends on an X-ray imaging device, a measurement parameter used to record the X-ray image, or the property of the X-ray image that depends on the X-ray imaging device and the measurement parameter used to record the X-ray image;
generating noise-reduced data, the generating of the noise-reduced data comprising applying a noise reduction algorithm to the variance-stabilized data;
generating a denoised X-ray image, the generating of the denoised X-ray image comprising applying an inverse transformation of the variance stabilizing transformation to the noise-reduced data, wherein denoising is performed for a digital subtraction angiography, wherein denoised images or sets of noise-reduced data are generated for each X-ray image of the angiography sequence, wherein a respective mask image is subtracted from the denoised image of each X-ray image, and wherein the mask images are generated by selecting the same X-ray image as a basic mask image for all source X-ray images;

generating motion compensated data, the generating of the motion compensated data comprising performing a motion compensation on a denoised image or on noise reduced data of the basic mask image; and setting the pixel values for mask data that is used to determine the mask image via the inverse transform or for the mask image to the value of the corresponding pixel of the motion compensated data when a similarity condition for that pixel is fulfilled, and to the value of the corresponding pixel of the denoised image or the noise reduced data of the basic mask image otherwise, wherein the similarity condition depends on the pixel values of the pixels surrounding the respective pixel in the denoised image or the noise reduced data of the respective x-ray source image and in the motion compensated data.

13. The non-transitory computer-readable storage medium of claim 12, wherein the processor is a processor of an X-ray imaging device.

\* \* \* \* \*

UNITED STATES PATENT AND TRADEMARK OFFICE
CERTIFICATE OF CORRECTION

PATENT NO. : 10,832,381 B2  
APPLICATION NO. : 16/047235  
DATED : November 10, 2020  
INVENTOR(S) : Norbert Strobel et al.

Page 1 of 1

It is certified that error appears in the above-identified patent and that said Letters Patent is hereby corrected as shown below:

On the Title Page

Item [74]:  
"Lempis Summerfield Katz, LLC"  
Should read:  
"Lempia Summerfield Katz, LLC"

Signed and Sealed this  
Thirteenth Day of April, 2021

Drew Hirshfeld  
*Performing the Functions and Duties of the*  
*Under Secretary of Commerce for Intellectual Property and*  
*Director of the United States Patent and Trademark Office*